(12) United States Patent
Smith

(10) Patent No.: US 6,601,374 B2
(45) Date of Patent: Aug. 5, 2003

(54) WEED TRIMMER TO MOWER ATTACHMENT KIT

(76) Inventor: Bruce R. Smith, 6305 NW. 35th St., Bethany, OK (US) 73008

( * ) Notice: Subject to any disclaimer, the term of this patent is extended or adjusted under 35 U.S.C. 154(b) by 0 days.

(21) Appl. No.: 10/022,929

(22) Filed: Dec. 18, 2001

(65) Prior Publication Data

US 2002/0083693 A1 Jul. 4, 2002

Related U.S. Application Data

(60) Provisional application No. 60/259,537, filed on Jan. 4, 2001.

(51) Int. Cl.7 ............................................... A01D 34/00
(52) U.S. Cl. ......................................... 56/13.6; 56/12.7
(58) Field of Search ...................... 56/1, 2, 12.7, 11.6, 56/13.6, 13.7, 13.8, 16.9, 17.5, DIG. 9

(56) References Cited

U.S. PATENT DOCUMENTS

| | | | |
|---|---|---|---|
| 3,782,085 A | * 1/1974 | Parker et al. | ................. 56/11.6 |
| 4,152,882 A | * 5/1979 | Howard | ....................... 56/13.7 |
| 4,182,100 A | * 1/1980 | Letter | ........................... 56/16.7 |
| 4,378,668 A | 4/1983 | Gullett | |
| 4,453,372 A | * 6/1984 | Remer | ........................ 56/13.7 |
| 4,642,976 A | 2/1987 | Owens | |
| 4,653,254 A | * 3/1987 | Qualls | .......................... 56/16.9 |
| 4,663,920 A | * 5/1987 | Skovhoj | ...................... 56/12.7 |
| 4,756,147 A | 7/1988 | Savell | |
| 4,781,014 A | 11/1988 | Conboy | |
| D304,728 S | 11/1989 | Piorkowski | |
| 5,065,566 A | 11/1991 | Gates | |
| 5,174,100 A | 12/1992 | Wassenberg | |
| D359,291 S | 6/1995 | Tihonovich | |
| 5,561,969 A | * 10/1996 | Sandy | ......................... 56/13.6 |
| 5,701,728 A | 12/1997 | Koka | |

* cited by examiner

*Primary Examiner*—Robert E. Pezzuto
(74) *Attorney, Agent, or Firm*—Randal D. Homburg

(57) ABSTRACT

A component kit allowing a user to removably attach a gasoline engine weed trimmer to a push-type deck lawn-mower allowing a user to activate the weed trimmer during the mowing of a yard to trim areas beside the mower while mowing the yard, eliminating duplicate effort and also to relieve the stress of carrying the weed trimmer, the component kit placing the vertical weight of the weed trimmer on the lawnmower.

2 Claims, 4 Drawing Sheets

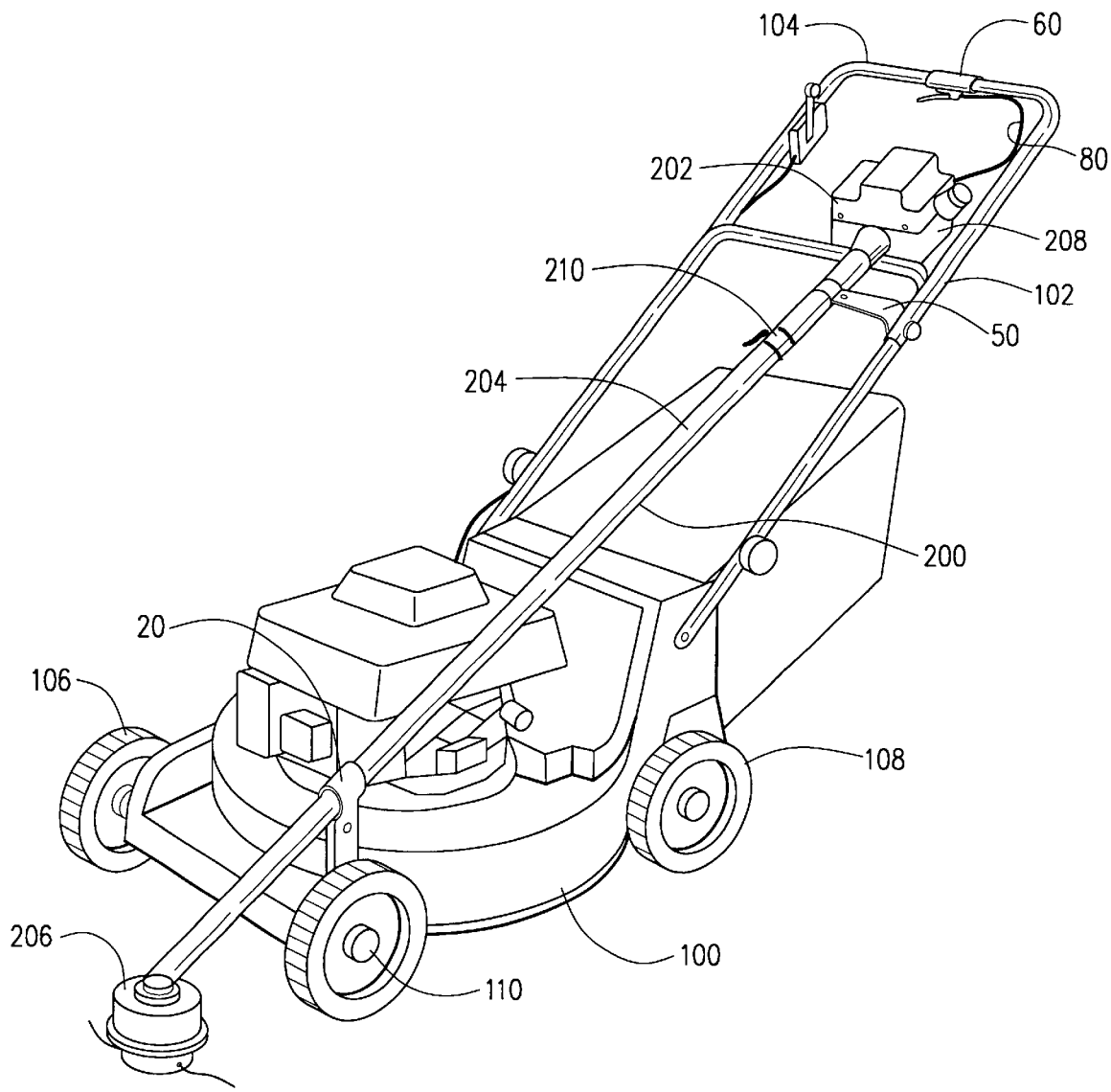

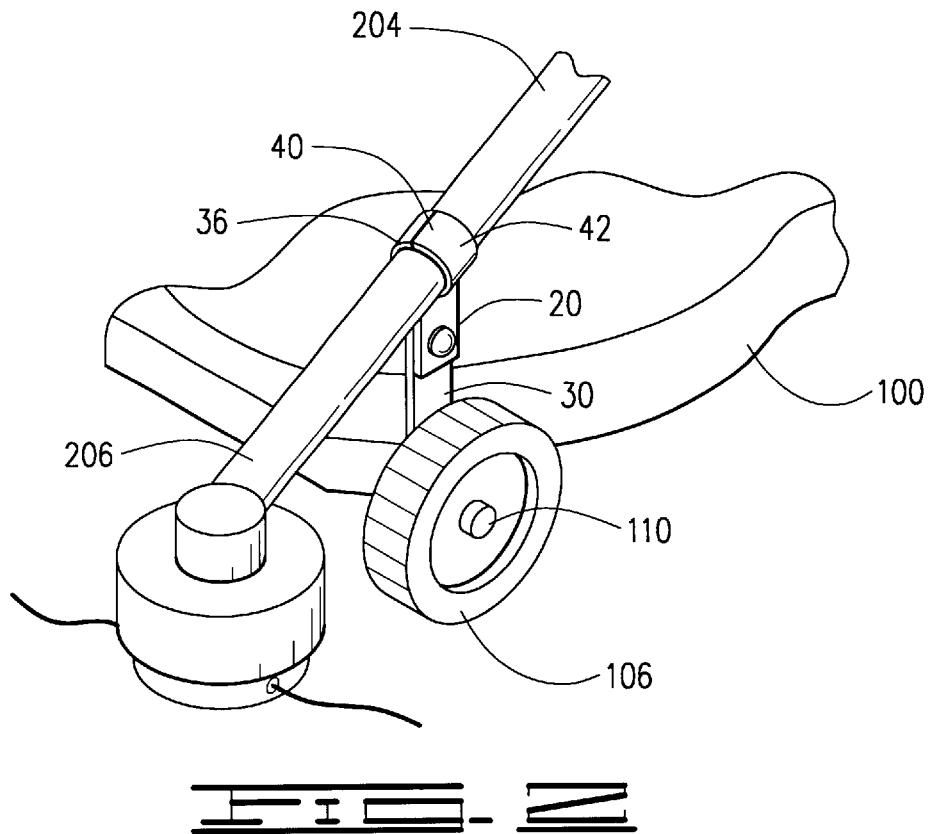
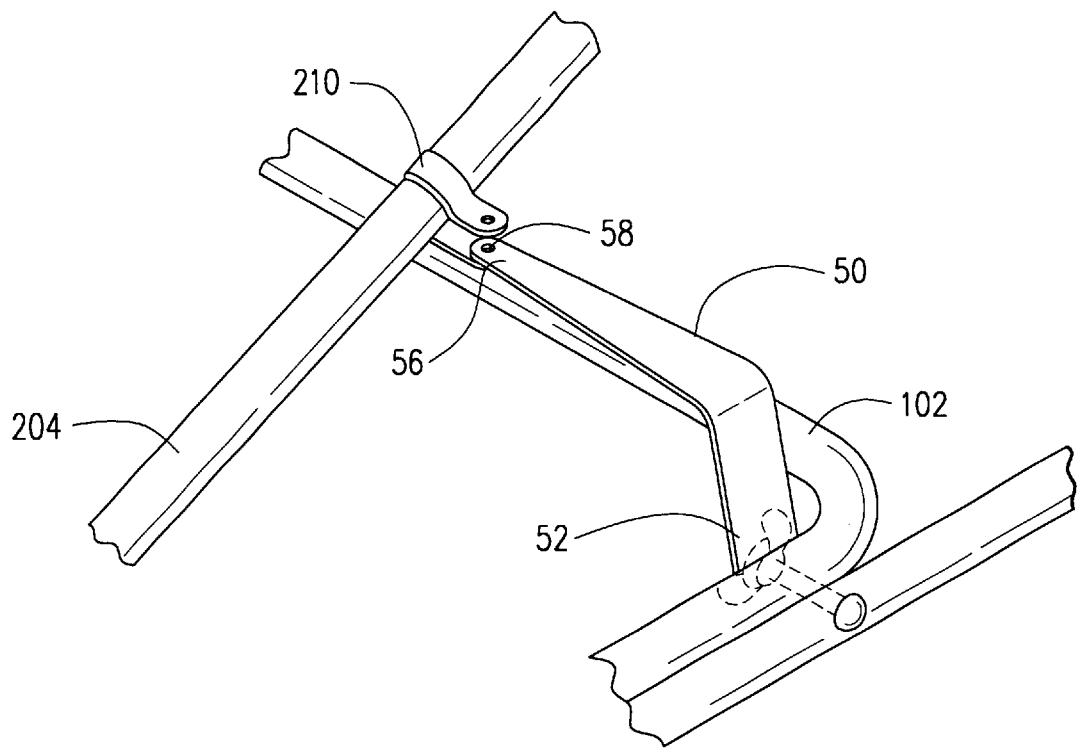

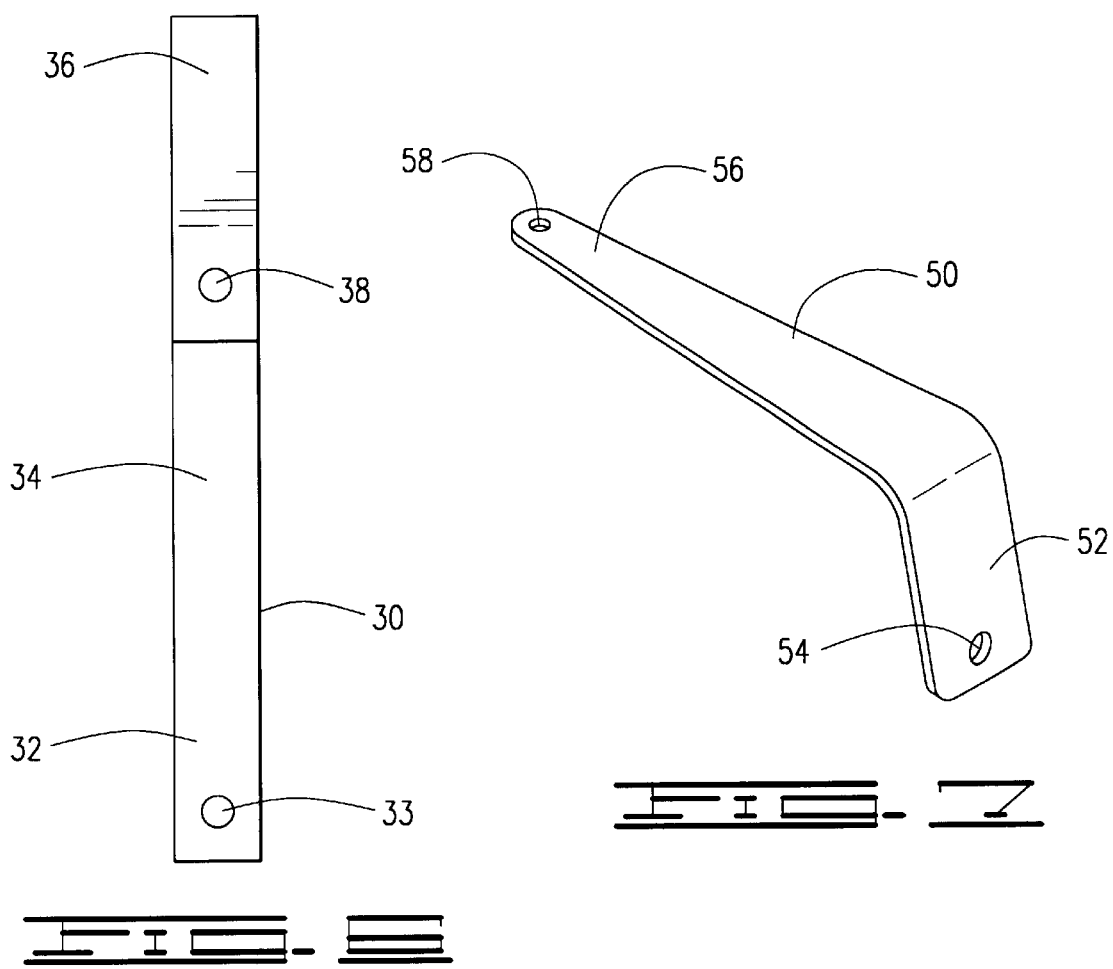
FIG. 7
FIG. 6
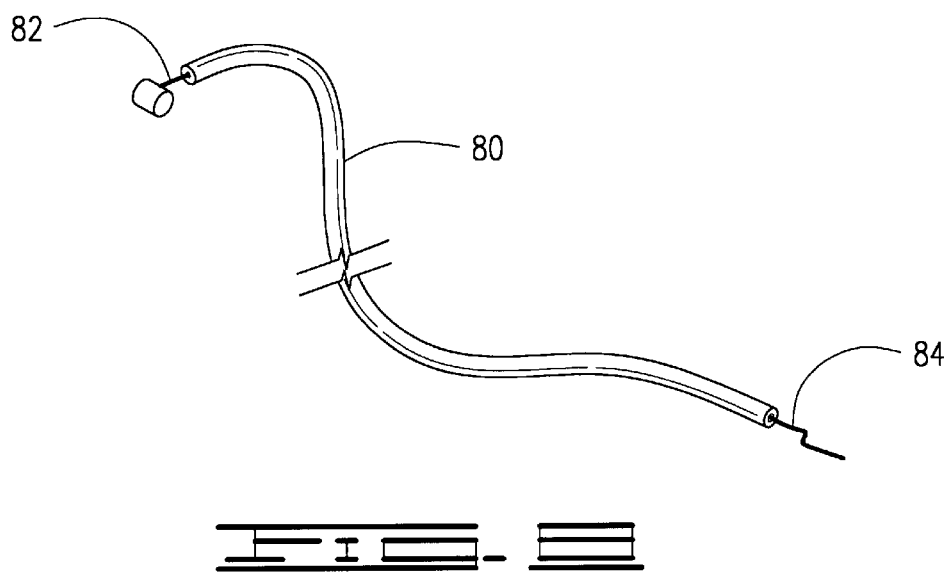
FIG. 8

WEED TRIMMER TO MOWER ATTACHMENT KIT

CROSS-REFERENCE TO RELATED APPLICATIONS

Provisional Patent Application No. 60/259,537, filed on Jan. 4, 2001.

I. BACKGROUND OF INVENTION

1. Field of the Invention

The invention is a component kit allowing a user to removably attach a gasoline engine weed trimmer to a push type deck lawnmower allowing a user to activate the weed trimmer during the mowing of a yard to trim areas beside the mower while mowing the yard, eliminating duplicate effort and also to relieve the stress of carrying the weed trimmer, the component kit placing the vertical weight of the weed trimmer on the lawnmower.

2. Description of Prior Art

The following United States patents are identified and disclosed herein. Several devices are disclosed relating to lawnmowers incorporating a weed trimming component in addition to the mowing apparatus. However, all of them tend to incorporate such weed trimming component as a permanent installation or an integrated component, unlike the present invention which is a removable installation, allowing for the quick removal and attachment of most gasoline engine weed trimming devices.

In U.S. Pat. No. 4,781,014 to Conboy, Jr., appears to convert a regular rotary mower to a cord line trimmer, replacing the blade with a cord reel with some form of line release. U.S. Pat. No. 4,756,147 to Savell, a wheeled attachment for a weed trimmer is provided, converting a standard weed trimmer into a wheeled line trimmer allowing the trimmer to be rolled instead of carried. Several rotary trimmers under a singular deck are provided in U.S. Pat. No. 4,378,668 to Gullett.

In U.S. Pat. No. 5,701,728 to Koka and U.S. Pat. No. 5,174,100 to Wassenberg, combination mower and trimmer devices are disclosed feeding trimming lines along the blade of a rotary mower, allowing the rotary mower to be used as a line trimmer, the line extending beyond the radius of the rotary cutting blade. In U.S. Design Pat. Nos. D 304,728 to Piorkowski and U.S. Pat. No. D 359,291 to Tihonovich, apparently permanent trimmer attachments are disclosed, with '728 to Piorkowski disclosing a front attachment which maybe adjustable and '291 to Tihonovich which is set on the left front of the mower deck, such attachment being originally integrated into the mower deck. A fully adjustable line trimmer mounted to a mower deck is disclosed with the line trimmer being height, angle and directionally adjustable deriving the power source from either the mower engine shaft or electrical power from the mower. In U.S. Pat. No. 5,065,566 to Gates, a flexible line trimmer attachment for a tractor driven mower deck for trimming while mowing is disclosed, having a boom which is deflected up to a 180 degree angle, such boom having a spring attaching to the boom to return the boom to a resting position.

II. SUMMARY OF THE INVENTION

The primary objective of the current invention is to provide a means to allow a gasoline powered line trimmer to be removably attached to the deck of a lawnmower wherein the gasoline powered line trimmer may be removed for independent line trimming or attached to provide line trimming while mowing. A second objective of the invention is to provide such attachment means on either the right or left side of the mower deck to accommodate the choice of the user. A third objective is to provide the control trigger of the gasoline powered line trimmer in a location on the handle of the lawnmower to easily activate the attached line trimmer while mowing without distracting the user from attention to safety, placing such control trigger of the attached line trimmer in a location on the lawnmower handle where the user normally placed their hands and fingers.

III. DESCRIPTION OF THE DRAWINGS

The following drawings are informal drawings submitted with this provisional patent application.

FIG. 1 is a perspective view of the invention on a lawnmower with a line trimmer attached.

FIG. 2 is a closer view of the lower mounting bracket of the invention in relation to the lawnmower wheel attachment and the line end of the line trimmer extension.

FIG. 3 is a closer view of the upper mounting bracket of the invention in relation to the lawnmower handlebar and the engine end of the line trimmer extension.

FIG. 6 is a front view of the lower mounting bracket.

FIG. 7 is a perspective view of the upper mounting bracket.

FIG. 8 is a view of the throttle cable component of the invention.

IV. DESCRIPTION OF THE PREFERRED EMBODIMENT

Figure 4:
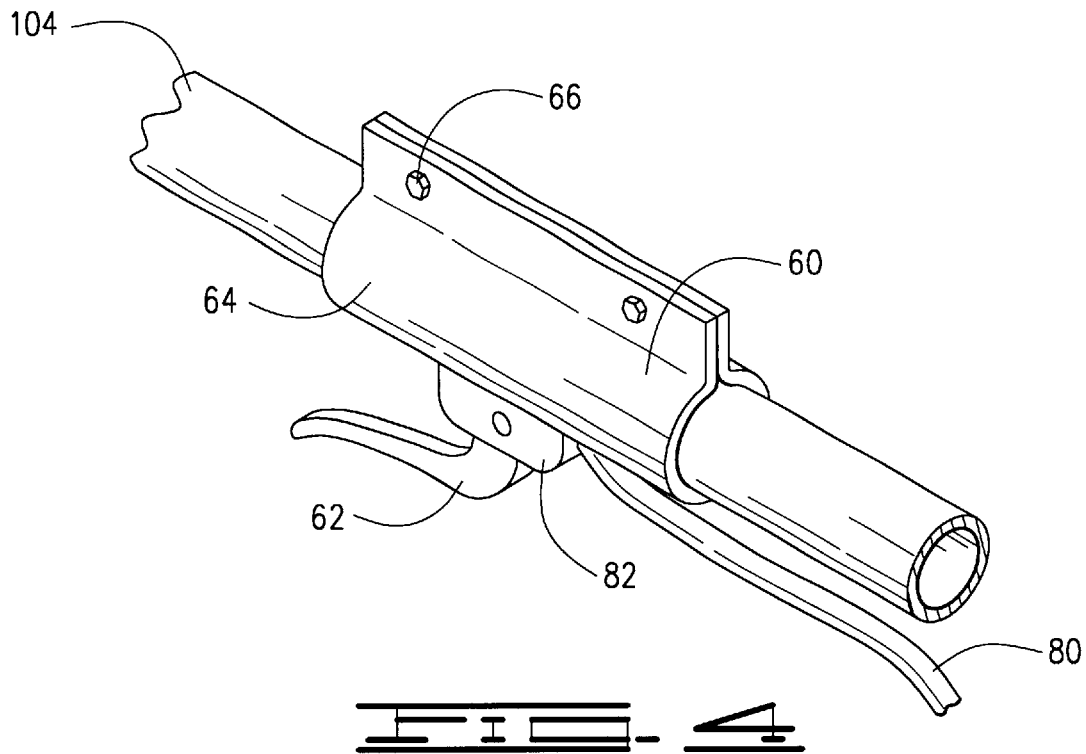
FIG. 4 is a closer view of the handlebar trigger of the invention mounted to the push bar of the lawnmower.

The invention 10, as shown in FIGS. 1–8 of the drawings, is a component kit to attach a gasoline engine weed trimmer 200 to a push-type deck lawnmower 100, the component kit comprising an upper mounting bracket 50, a lower mounting bracket 20, a handlebar trigger 60 and a throttle cable component 80. The lawnmower 100 to which the invention is applied has an upward angled lawnmower handle 102 including a horizontal push handlebar 104 and at least four wheels elevating the deck from the lawn, with two front wheels 106 and two back wheels 108 held onto the deck by wheel bolts 110. The weed trimmer 200 to which the invention is applied has a gasoline engine 202, a trimmer extension pole 204 which has a line trimmer end 206 and a gasoline engine end 208 and also has a trigger mechanism 210, a trigger operated throttle and a throttle cable.

Figure 5:
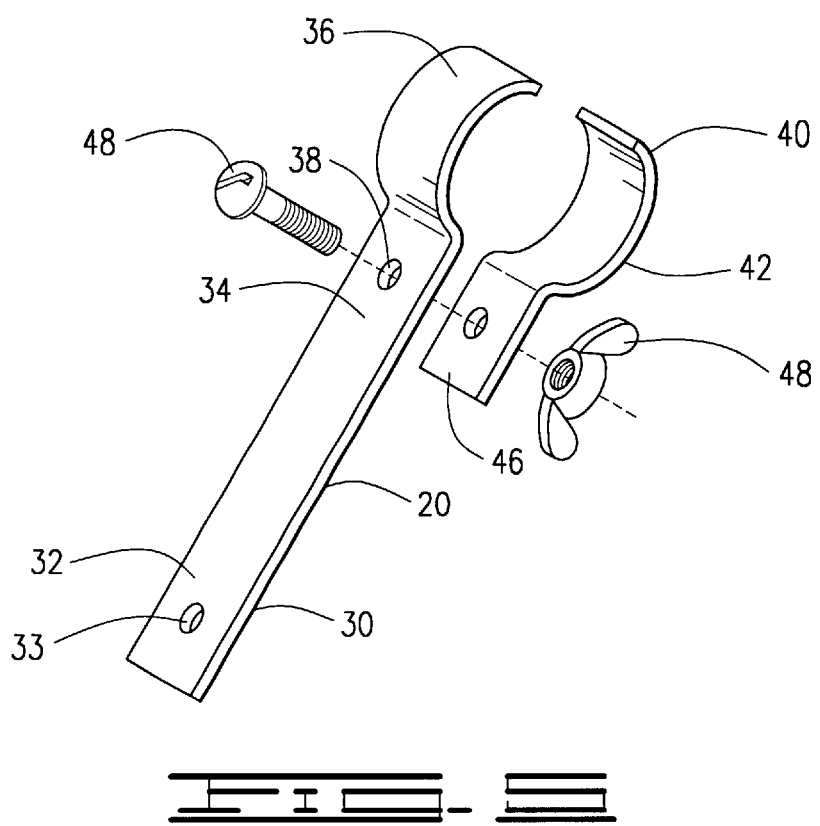
FIG. 5 is a side view of the lower mounting bracket.

The lower mounting bracket 20, further shown in FIGS. 2, 5 and 6 of the drawings, includes a support element 30, having a wheel mounting end 32 including a wheel mounting hole 33 and an extension mounting end 34, the extension mounting end 34 having a first curved half circle 36. A compression mounting hole 38 is located between the wheel mounting end 32 and the extension mounting end 34. The lower mounting bracket 20 also includes a press clamp element 40, having a second curved half circle 42 and a flattened end 44 with a compression mounting hole 46. The wheel mounting end 32 of the support bracket 30 is attached to either of the front wheels 106 of the lawnmower 100 by the wheel bolt 110 holding the front wheel 106 on the lawnmower being passed through the wheel mounting hole 33, with the support bracket 30 in an erect position. The trimmer extension pole 204 is then placed in the first curved half circle 36, after which the press clamp element 40 is applied to the support element 20 and a threaded bolt and wingnut 48 are placed through the compression mounting holes 38, 46 with the second curved half circle 42 of the press clamp element 40 also around the trimmer extension pole 204. The bolt and wingnut 48 are tightened to pinch the trimmer extension pole 204 between the first and second curved half circles 36, 42. This lower mounting bracket 20 attaches the line trimmer end 206 of the weed trimmer 200 to the lawnmower 100.

The upper mounting bracket 50, further shown in FIGS. 3 and 7 of the drawings, is an overall flat piece of triangular metal having a first end 52 having a hole 54, mounted to the lawnmower handle 102 either mounting to an already provided nut and bolt or attaching with a nut and bolt placed through a drilled hole in the lawnmower handle 102. The upper mounting bracket 50 also has a second end 56 attaching to the weed trimmer 200 on the trimmer extension pole 204 at a location where the trigger mechanism 210 is located using the same bolt and nut that attach the trigger mechanism 210 to the trimmer extension pole 204. This upper mounting bracket 50 attaches the gasoline engine end 208 of the weed trimmer 200 to the lawnmower handle 102.

The handlebar trigger 60, further shown in FIG. 4 of the drawings, mounts to the horizontal push handlebar 104 of the lawnmower handle 102 at a location desired by the user. The handlebar trigger 60 includes a spring loaded trigger 62 and a trigger mounting bracket 64. The trigger mounting bracket 62 captures the horizontal push handlebar 104 of the lawnmower handle 102 and is tightened using a compression nut and bolt 66. The throttle cable component 80, further shown in FIG. 8 of the drawings, has a first end 82 which is attached to the handlebar trigger 60 and a second end 84 which duplicates the end of the throttle cable provided on the weed trimmer 200. When mounting the weed trimmer 200 to the lawnmower 100, the throttle cable of the weed trimmer 200 is disengaged from the weed trimmer trigger operated throttle, and the second end 84 of the throttle cable component 80 is applied to the weed trimmer trigger operated throttle. Thus, the weed trimmer 200 is controlled by the throttle cable component 80 mounted to the lawnmower horizontal push handlebar 102 of the invention 10 instead of the trigger mechanism 210 of the weed trimmer 200.

The weed trimmer 200 can quickly be installed on the lawnmower 100 or removed from the lawnmower without any modification to the weed trimmer to use the weed trimmer independent of the lawnmower or as the user is mowing the lawn. The cutting height of the weed trimmer 200, while mounted on the lawnmower 100 may be adjusted by loosening the lower mounting bracket 20 and sliding the trimmer extension pole 204 within the first and second curved half circles 36, 42. In addition, the weed trimmer 200 may be rotated from a horizontal cutting position to a vertical cutting position to utilize the attached weed trimmer as a lawn edger while mounted on the lawnmower.

Although the embodiments of the invention have been described and shown above, it will be appreciated by those skilled in the art that numerous modifications may be made therein without departing from the scope of the invention as herein described.

I claim:

1. A component kit attaching a gasoline engine weed trimmer to a push-type deck lawnmower, the gasoline engine weed trimmer having a gasoline engine, a trimmer extension pole with a line trimmer end and a gasoline engine end, a trigger mechanism, a trigger operated throttle and a throttle cable, and the push-type deck lawnmower having an upward angled lawnmower handle including a horizontal push handlebar, a deck and at least four wheels elevating the deck from the lawn, with two front wheels and two back wheels held onto the deck by wheel bolts, the component kit comprising:
   a. an upper mounting bracket, attaching the gasoline engine end of the trimmer extension pole to the upward angled lawnmower handle of the push-type deck lawnmower;
   b. a lower mounting bracket, attaching the line trimmer end of the trimmer extension pole to the deck of the push-type deck lawnmower near one of the two front wheels;
   c. a handlebar trigger attaching to the upward angled lawnmower handle of the push-type deck lawnmower; and
   d. a throttle cable component attaching the handlebar trigger to the trigger operated throttle of the gasoline engine weed trimmer.

2. A component kit attaching a gasoline engine weed trimmer to a push-type deck lawnmower, the gasoline engine weed trimmer having a gasoline engine, a trimmer extension pole with a line trimmer end and a gasoline engine end, a trigger mechanism, a trigger operated throttle and a throttle cable, and the push-type deck lawnmower having an upward angled lawnmower handle including a horizontal push handlebar, a deck and at least four wheels elevating the deck from the lawn, with two front wheels and two back wheels held onto the deck by wheel bolts, the component kit comprising:
   A. a lower mounting bracket including:
      1. a support element having;
         a. a wheel mounting end including a wheel mounting hole, such wheel mounting end attached to either of the front wheels of the lawnmower by a wheel bolt attaching the front wheel to the deck, such wheel bolt passing through the wheel mounting hold with the support bracket in an erect position;
         b. an extension mounting end having a first curved half circle;
         c. a compression mounting hole located between the wheel mounting end and the extension mounting end; and
      2. a press clamp element having a second curved half circle and a flattened end with a compression mounting hole, wherein the trimmer end of the trimmer extension pole is placed in the first curved half circle, after which the press clamp element is applied to the support element and a threaded bolt and wingnut are placed through the compression mounting holes of the support element and the press clamp element with the second curved half circle of the press clamp element also around the trimmer end of the trimmer extension pole after which the bolt and wingnut are tightened to pinch the trimmer extension pole between the first and second curved half circles;
   B. an upper mounting bracket defining an overall flat piece of triangular metal having a first end having a hole, mounted to the lawnmower handle, and a second end attaching to the weed trimmer on the trimmer extension pole at a location where the trigger mechanism of the weed trimmer is already located using a same bolt and nut that attach the trigger mechanism to the trimmer extension pole, thus attaching the gasoline engine end of the weed trimmer to the lawnmower handle;
   C. a handlebar trigger mounting to the lawnmower handle, such handlebar trigger including a spring loaded trigger and a trigger mounting bracket, the trigger mounting bracket capturing the lawnmower handle, tightened using a compression nut and bolt; and D. a throttle cable component having a first end attached to the handlebar trigger and a second end which duplicating an end of the throttle cable provided on the weed trimmer attached to the throttle of the weed trimmer disengaging the throttle cable from the weed trimmer from the weed trimmer trigger operated throttle, and attaching the second end of the throttle cable component to the weed trimmer trigger operated throttle, thus controlling the weed trimmer by the throttle cable component mounted to the lawnmower handle instead of the trigger mechanism of the weed trimmer.

* * * * *